United States Patent
Choi et al.

(10) Patent No.: US 9,273,839 B2
(45) Date of Patent: Mar. 1, 2016

(54) VIBRATION-ABSORBING TYPE OF STREET-LIGHTING POLE USING SILICONE AND MASS

(71) Applicants: LIGHT WORLD CO., LTD., Gyeonggi-do (KR); BRITEC CO., LTD., Gyeonggi-do (KR)

(72) Inventors: Sae Kyou Choi, Gyeonggi-do (KR); Moon Sik Yoo, Gyeonggi-do (KR)

(73) Assignees: Light World Co., Ltd., Gyeonggi-Do (KR); Britec Co., Ltd., Gyeonggi-Do (KR)

( * ) Notice: Subject to any disclaimer, the term of this patent is extended or adjusted under 35 U.S.C. 154(b) by 0 days.

(21) Appl. No.: 14/383,658

(22) PCT Filed: Nov. 21, 2012

(86) PCT No.: PCT/KR2012/009852
§ 371 (c)(1),
(2) Date: Sep. 8, 2014

(87) PCT Pub. No.: WO2013/133506
PCT Pub. Date: Sep. 12, 2013

(65) Prior Publication Data
US 2015/0028181 A1 Jan. 29, 2015

(30) Foreign Application Priority Data
Mar. 8, 2012 (KR) .......................... 10-2012-0023744

(51) Int. Cl.
| | | |
|---|---|---|
| F16M 13/00 | (2006.01) | |
| F21S 8/08 | (2006.01) | |
| F21V 21/10 | (2006.01) | |
| F16F 7/104 | (2006.01) | |
| F21V 15/04 | (2006.01) | |
| F21V 31/00 | (2006.01) | |
| E04H 12/00 | (2006.01) | |

(52) U.S. Cl.
CPC ................. *F21S 8/086* (2013.01); *F16F 7/104* (2013.01); *F21V 15/04* (2013.01); *F21V 21/10* (2013.01); *F21V 31/00* (2013.01); *E04H 12/00* (2013.01); *Y02B 20/72* (2013.01)

(58) Field of Classification Search
CPC .......... F16F 15/067; F16F 13/00; F21V 15/04
See application file for complete search history.

(56) References Cited

U.S. PATENT DOCUMENTS 3,784,179 A * 1/1974 Sugiura .......................... 267/35

FOREIGN PATENT DOCUMENTS

| KR | 2003-0068595 | 8/2003 |
|---|---|---|
| KR | 10-2007-0090083 | 9/2007 |
| KR | 10-0770309 | 10/2007 |
| KR | 10-1066589 | 9/2011 |

* cited by examiner

Primary Examiner — Amy Sterling
(74) Attorney, Agent, or Firm — Jordan and Hamburg LLP

(57) ABSTRACT

A street-lighting pole incorporates a vibration-reducing means on the upper end part of a pole provided standing vertically, wherein: the upper end part of the pole is formed so as to have a silicone receiving part of which the upper part is open in such a way that silicone oil can be stored to a predetermined level on the inside thereof; a removable cap is constituted so as to couple in removable fashion to an upper intake part of the silicone receiving part; a resilient supporting body of a predetermined length is constituted in the center of the removable cap; and a mass of a predetermined weight is constituted at the lower end part of the resilient supporting body.

2 Claims, 5 Drawing Sheets

VIBRATION-ABSORBING TYPE OF STREET-LIGHTING POLE USING SILICONE AND MASS

BACKGROUND OF THE INVENTION

The present invention relates to a street-lighting pole, and more particularly to a vibration-absorbing type street-lighting pole using silicone and a mass capable of attenuating external vibration transmitted thereto, thereby preventing negative influence on a light and a pole.

In general, a streetlight is a tall post with a light at the top, which stands on the boundary between a road and a sidewalk or in a harbor facility to illuminate the same. Such a streetlight may have various shapes.

However, a conventional street-lighting traffic facility, such as a streetlight or a lighting tower, has shortcomings such that a lifespan is reduced by increase of a fatigue load due to vibration caused by vehicle traveling, typhoon, earthquake, wind, etc., and a maintenance cost is enormously increased by frequent troubles due to the vibration transmitted to a street-lighting pole and a light source.

In other words, because a conventional streetlight does not have a vibration-proof structure, it has problems of reduced lifespan and excessive maintenance costs due to frequent contact failure of a light bulb.

Further, damage to the traffic facility causes expenses for maintenance and loss of time and space due to undesirable traffic control for repair work. In addition, damage to the streetlight causes risk or danger of an accident of a vehicle and a pedestrian.

Prior art, which has been devised to solve the above problems by the present applicant, is disclosed in Korean Patent Registration No. 1066589 (Title: STREET-LIGHTING POLE HAVING VIBRATION-REDUCING DEVICE).

However, the street-lighting pole having a vibration-reducing device of the above prior art has shortcomings such that, because a vibration-reducing device is separately manufactured and simply mounted to the top of the pole, it is impossible to control the period of vibration according to field situation.

Further, the above prior art has inconvenience in assembling an additional coupling cap for preventing the vibration-reducing device from being separated from the street-lighting pole.

SUMMARY OF THE INVENTION

Therefore, the present invention has been made in view of the above problems, and it is an object of the present invention to provide a vibration-absorbing type street-lighting pole using silicone and a mass capable of maximizing a vibration-reduction effect by forming a vibration-reducing device integrally with the pole and controlling the period of vibration using such a vibration-reducing device.

It is another object of the present invention to provide a vibration-absorbing type street-lighting pole using silicone and a mass capable of improving an assembling efficiency by simplifying a mounting structure of the vibration-reducing device.

In accordance with an aspect of the present invention, the above and other objects can be accomplished by the provision of a vibration-absorbing type street-lighting pole using silicone and a mass having a vibration-reducing device mounted to a top of a pole vertically erected, the street-lighting pole comprising: a silicone receiving part formed at the top of the pole and having an opened upper portion to store silicone oil to a predetermined level therein; a removable cap removably coupled to an entrance of the upper portion of the silicone receiving part; a resilient supporting body having a predetermined length and extending from a center of the removable cap; and a mass having a predetermined weight and coupled to a lower end portion of the resilient supporting body.

According to the vibration-absorbing type street-lighting pole using silicone and a mass of the present invention, since the vibration-reducing device has an open structure such that the silicone oil is stored in the upper end portion of the pole and the mass is mounted integrally with the removable cap, the period of vibration of the mass can be easily controlled.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
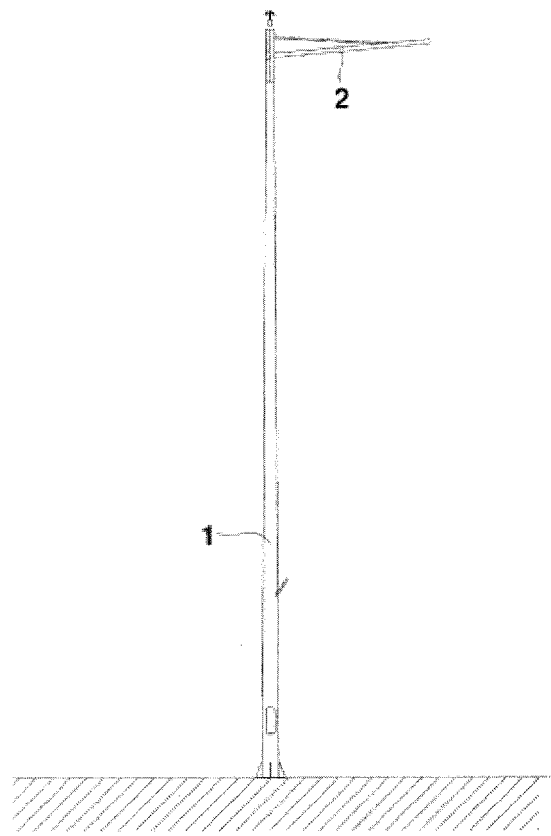
FIG. 1 is a structural view of a vibration-absorbing type street-lighting pole according to a first embodiment of the present invention.
Figure 2:
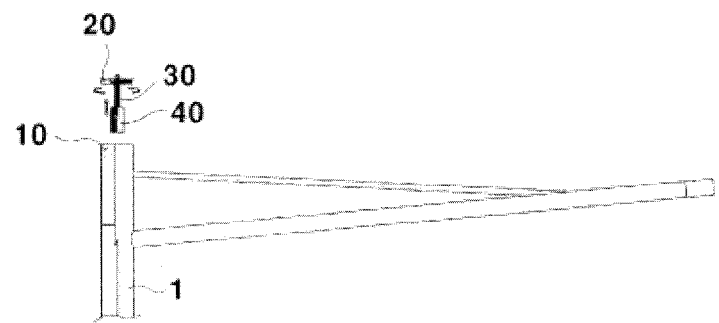
FIG. 2 is a detailed cross-sectional view illustrating a separated state of a vibration-reducing device of a street-lighting pole according to the present invention.
Figure 3:
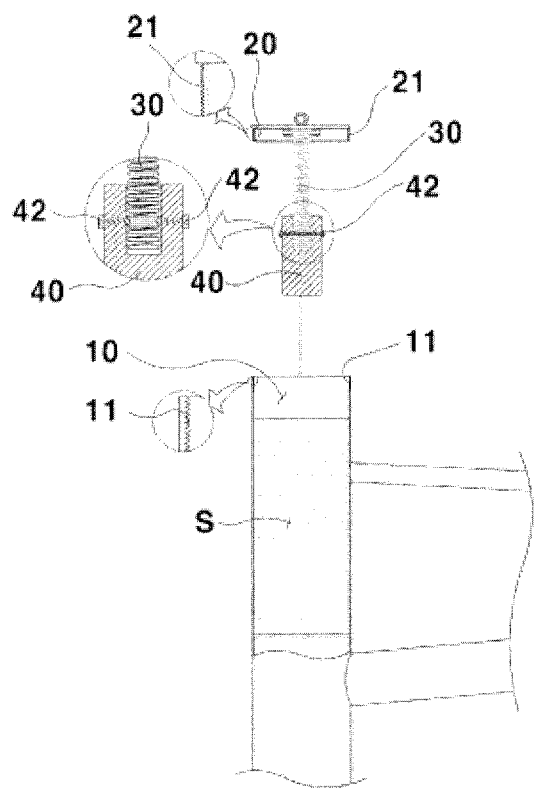
FIG. 3 is a detailed cross-sectional view illustrating a mounted state of a vibration-reducing device of a street-lighting pole according to the present invention.
Figure 4:
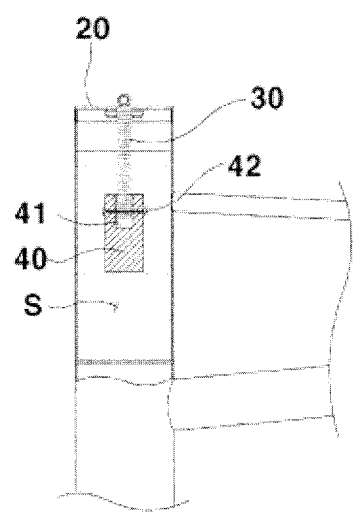
FIG. 4 is a cross-sectional enlarged view of a mass of a vibration-reducing device according to a first embodiment of the present invention.

Now, preferred embodiments of the present invention will be described in detail with reference to the accompanying drawings.

Referring to FIGS. 1 through 4, a vibration-absorbing type street-lighting pole according to a first embodiment of the present invention includes a vibration-reducing device mounted to the top of a pole 1 which stands vertically for illuminating the street. The vibration-reducing, device includes a silicone receiving part 10 having an opened upper portion to store silicone oil S to a predetermined level therein, a removable cap 20 coupled to an entrance of the upper portion of the silicone receiving part 10, a resilient supporting body 30 having a predetermined length and extending from a center of the removable cap 20, and a mass 40 having a predetermined weight and coupled to a lower end portion of the resilient supporting body 30.

In other words, the vibration reducing device has an open structure such that, if the removable cap 20 is removed, the mass 40 is exposed to the outside.

Both the entrance of the upper portion of the silicone receiving part 10 and the outer circumferential surface of the removable cap 20 are formed with threads 11 and 21 so as to screw-couple the silicone receiving part 10 and the removable cap 20.

The mass 40 is formed with an insertion recess 41 into which the resilient supporting body 30 is inserted. The mass 40 has an adjustment piece 42 mounted horizontally in the middle portion of the mass 40 in order to adjust a height of the resilient supporting body 30 mounted to the mass 40.

In the drawings, undescribed reference numeral 2 represents a horizontal supporting rod for supporting a lamp (not shown), and undescribed reference numeral 22 represents a ring-shaped knob.

An operational effect of the vibration-absorbing type street-lighting pole according to the first embodiment of the present invention as structured above will now be described.

First, the silicone Oil S is filled to a predetermined level in the silicone receiving part 10, and the removable cap 20 is coupled to the top of the pole 1 in a screw-coupling manner. The mass 40 supported by a predetermined resilient force of the resilient supporting body 30 is dipped in the silicone oil S having a constant viscosity.

The street-lighting pole equipped with the vibration-reducing device according to the present invention stands by the side of a road, a bridge, etc., to illuminate the road. Vibration due to a wind load, a load of a running vehicle, an earthquake, etc., may be transmitted to the pole 1 via the ground.

When vibration is transmitted to the pole 1, the mass 40 is caused to move horizontally or vertically according to a vibration direction, thereby controlling vibration by virtue of the force of inertia.

The movement of the mass 40 by vibration acts to attenuate vibration by the silicone oil S having a predetermined viscosity. Accordingly, the magnitude of vibration transmitted to the lamp (not shown) is remarkably reduced, and thus the safety and durability of the facility can be increased.

Further, since the mass 40 in this embodiment is connected to the resilient supporting body 30 through the adjustment piece 42, the period of vibration of the mass 40 can also be controlled according to adjustment in length of the resilient supporting body 30.

In other words, if the mounting position of the resilient supporting body 30 is adjusted using the adjustment piece 42 according to field situation such as a length or a weight of the pole 1, etc., the period of vibration of the mass 40 can be optimized, thereby maximizing the vibration-reducing effect.

Further, in the case in which the silicone oil S degrades or is lost, replacement or supplement of the silicone oil S can be easily achieved after removing the removable cap 20.

Figure 5:
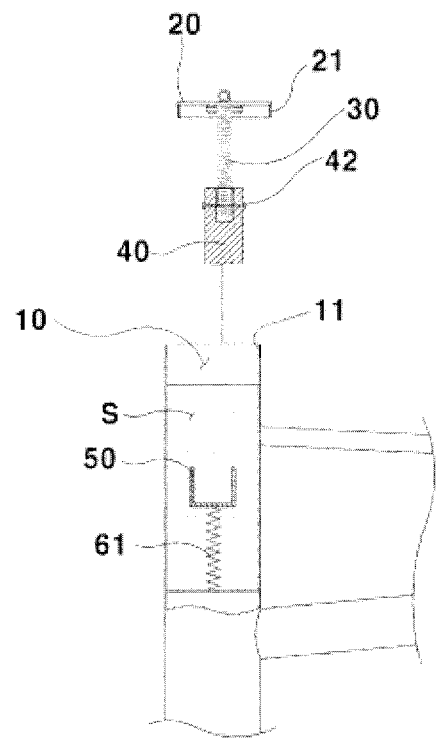
FIG. 5 is a view illustrating a separated state of a mass of a vibration-reducing device according to a second embodiment of the present invention.
Figure 6:
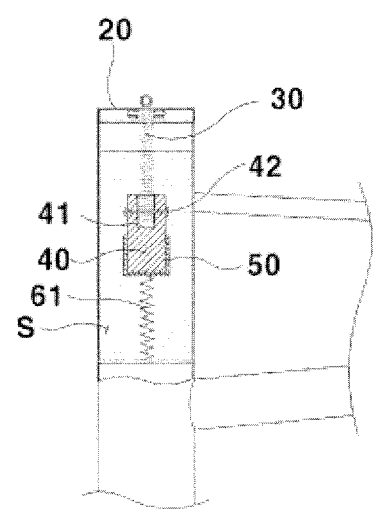
FIG. 6 is a view illustrating a mounted state of a mass of a vibration-reducing device according to a second embodiment of the present invention.

FIGS. 5 and 6 are views illustrating a mounting structure of a vibration-reducing device according to a second embodiment of the present invention. The vibration-reducing device includes a damping part 50 mounted in the silicone receiving part 10 and having a receiving recess 51 to receive the mass 40 therein, and a first support spring 61 connected vertically to the bottom of the silicone receiving part 10 in order to resiliently support the damping part 50.

The damping part 50, which is resiliently supported by the first support spring 61 as described above, prevents sudden vertical movement of the mass 40.

Specifically, since the mass 40 receives a resilient support force in a vertical direction from the resilient supporting body 30 disposed on the mass 40 and also receives a resilient support force in a vertical direction from the first support spring 61 disposed under the mass 40, control of vertical vibration can be achieved more stably.

Figure 7:
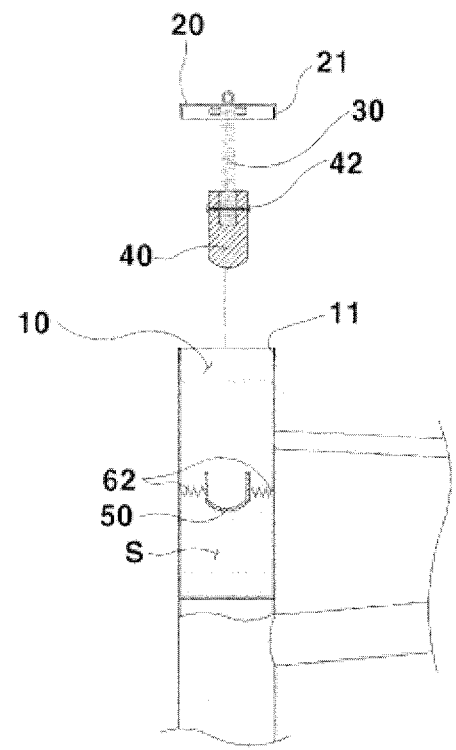
FIG. 7 is a view illustrating a separated state of a mass of a vibration-reducing device according to a third embodiment of the present invention.
Figure 8:
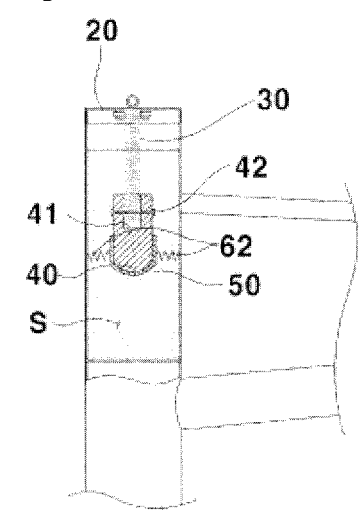
FIG. 8 is a view illustrating a mounted state of a mass of a vibration-reducing device according to a third embodiment of the present invention.

FIGS. 7 and 8 are views illustrating a mounting structure of a vibration-reducing device according to a third embodiment of the present invention.

As shown in the drawings, the vibration-reducing device includes a damping part 50 mounted in the silicone receiving part 10 and having a receiving recess 51 to receive the mass 40 therein, and a plurality of second support springs 62 connected symmetrically or radially to a lateral wail of the silicone receiving part 10 in order to resiliently support the damping part 50. The mass 40 and the receiving recess 51 may have curved bottom surfaces.

The damping part 50, which is resiliently supported by the second support springs 62 as described above, prevents sudden horizontal movement of the mass 40.

Specifically, since the mass 40 receives a resilient support force in a vertical direction from the resilient supporting body 30 disposed on the mass 40 and also receives a resilient support force in a horizontal direction from the second support springs 62 disposed around the mass 40, control of vertical and horizontal vibration can be achieved more stably.

Since the mass 40 and the receiving recess 51 have the curved bottom surfaces, even though the mass 40 is displaced left and right, the mass 40 and the receiving recess 51 are maintained in a stable surface contact state. Accordingly, a damping effect in a horizontal direction can be maximized.

Figure 9:
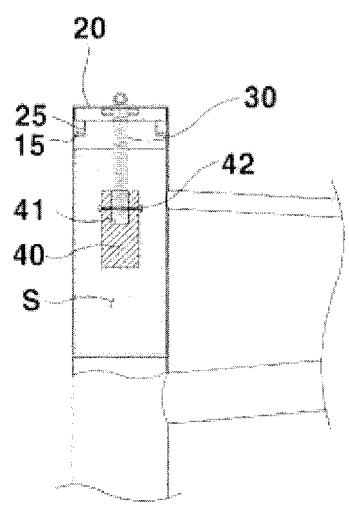
FIG. 9 is a cross-sectional view of a vibration-reducing device according to a fourth embodiment of the present invention.

FIG. 9 is a view illustrating a structure of a vibration-reducing device according to a fourth embodiment of the present invention. The silicone receiving part 10 has a ring-shaped leakage-prevention protrusion 15 formed on an upper inner peripheral surface thereof in order to prevent leakage of the silicone oil S, and the removable cap 20 has a tight contact portion 25 formed along a circumference of a bottom surface thereof corresponding to the leakage-prevention protrusion 15. The tight contact portion 25 of the removable cap 20 tightly surface-contacts the leakage-prevention protrusion 15 of the silicone receiving part 10, thereby keeping the silicone receiving part 10 in an airtight state.

According to the above-described structure, even when vibration is transmitted to the pole 1, the silicone oil S stored to a predetermined level in the silicone receiving part 10 is prevented from overflowing by the leakage-prevention protrusion 15. Further, by virtue of the tight surface contact between the leakage-prevention protrusion 15 and the tight contact portion 25, even when sudden external vibration due to earthquake or the like is transmitted to the pole 1, leakage of the silicone oil S through a gap of the screw-coupling portion between the removable can 20 and the silicone receiving part 10 is fundamentally prevented.

Accordingly, the vibration-reducing function can be more stably maintained by preventing loss of the silicone oil S.

The present invention is applied to a street-lighting facility so as to attenuate vibration transmitted to the street-lighting facility.

The invention claimed is:

1. A vibration-absorbing street-lighting pole, comprising:
a pole which is to be vertically erected, a silicone receiving part formed at a top of the pole and having an opened upper portion to store silicone oil to a predetermined level therein;
a removable cap removably coupled to an entrance of the upper portion of the silicone receiving part;
a resilient supporting body having a predetermined length and extending from a center of the removable cap;

a mass having a predetermined weight and coupled to a lower end portion of the resilient supporting body; and a damping part configured to resiliently damp movement of the mass in a vertical direction within the silicone receiving part, the damping part being mounted within the silicone receiving part and being distinct from the resilient supporting body.

2. A vibration-absorbing street-lighting pole, comprising:

a pole which is to be vertically erected, a silicone receiving part formed at a top of the pole and having an opened upper portion to store silicone oil to a predetermined level therein;

a removable cap removably coupled to an entrance of the upper portion of the silicone receiving part;

a resilient supporting body having a predetermined length and extending from a center of the removable cap;

a mass having a predetermined weight and coupled to a lower end portion of the resilient supporting body;

a damping part mounted in the silicone receiving part and having a receiving recess to receive the mass therein; and a first support spring connected to a bottom of the silicone receiving part in order to resiliently support the damping part.

* * * * *